United States Patent [19]

Casale et al.

[11] Patent Number: 5,279,392
[45] Date of Patent: * Jan. 18, 1994

[54] FOOD PREPARATION AND DELIVERY APPARATUS

[75] Inventors: Frank R. Casale; Nicola D. Casale; Antonio A. Casale; Richard P. Bennett; Gilbert F. Padilla, all of Albuquerque, N. Mex.

[73] Assignee: Nunzio's Pizza, Inc., Beverly Hills, Calif.

[*] Notice: The portion of the term of this patent subsequent to May 5, 2009 has been disclaimed.

[21] Appl. No.: 680,589

[22] Filed: Apr. 4, 1991

Related U.S. Application Data

[62] Division of Ser. No. 358,418, May 26, 1989, Pat. No. 5,109,956.

[51] Int. Cl.$^5$ .............................................. E04H 3/02
[52] U.S. Cl. ........................................ 186/41; 186/50; 221/96
[58] Field of Search ............... 186/36, 37, 41, 49, 186/50, 51, 53; 198/801, 637, 569; 52/28, 33, 73, 65, 174, 175; 40/452, 453, 463, 902; 221/96, 84; 340/792; 362/145, 151, 806

[56] References Cited

U.S. PATENT DOCUMENTS

| | | | |
|---|---|---|---|
| D. 247,830 | 5/1978 | Cunningham | D20/19 |
| D. 274,629 | 7/1984 | Plumettaz | D20/41 |
| D. 279,909 | 7/1985 | Huston | D20/10 |
| D. 296,473 | 6/1988 | Hooker | D25/1 |
| D. 303,842 | 10/1989 | Bayouth, Jr. | D25/33 |
| D. 311,775 | 10/1990 | Brown | D25/33 |
| D. 313,473 | 1/1991 | Isenhour et al. | D25/33 |
| 1,140,110 | 5/1915 | Buck | 198/569 X |
| 1,736,472 | 11/1929 | Wego | 198/801 |
| 1,876,510 | 9/1932 | Morrison | 221/84 X |
| 2,129,399 | 9/1938 | Binder | 40/584 |
| 2,405,294 | 8/1946 | Delucchi | 186/41 |
| 2,656,013 | 10/1953 | Ellithorpe | 186/37 |
| 2,912,066 | 11/1959 | Ellithorpe | 186/37 |
| 3,616,965 | 11/1971 | Bendl | 221/84 |
| 3,634,958 | 1/1972 | Drowns | 40/493 |
| 3,647,026 | 3/1972 | Alexander et al. | 186/53 |
| 3,702,666 | 11/1972 | Stano | 221/96 X |
| 3,774,723 | 11/1973 | Johnston | 186/36 |
| 4,006,798 | 2/1977 | De Mund | 186/37 |
| 4,173,035 | 10/1979 | Hoyt | 362/806 X |
| 4,234,187 | 11/1980 | Las | 40/493 |
| 4,505,375 | 3/1985 | Kuster | 198/482 |
| 4,644,707 | 2/1987 | Aubourg et al. | 52/65 |
| 4,735,289 | 4/1988 | Kenyon | 186/37 |
| 4,805,738 | 2/1989 | Vayda | 186/36 |

*Primary Examiner*—F. J. Bartuska
*Attorney, Agent, or Firm*—Peacock, Deborah A.; Donovan F. Duggan; Dennis F. Armijo

[57] ABSTRACT

The disclosure is directed to a food service facility for drive-up and walk-up patronage, to a method for food preparation, to a retractable menu, and to a drink dispenser and service module. The food service facility comprises base level and second level housings, readily set up and removed from a site. The food preparation method is primarily directed to pizza preparation, the pizza being incompletely cooked and stored, and then rapidly cooked to completion to provide fast food service time to patrons.

90 Claims, 12 Drawing Sheets

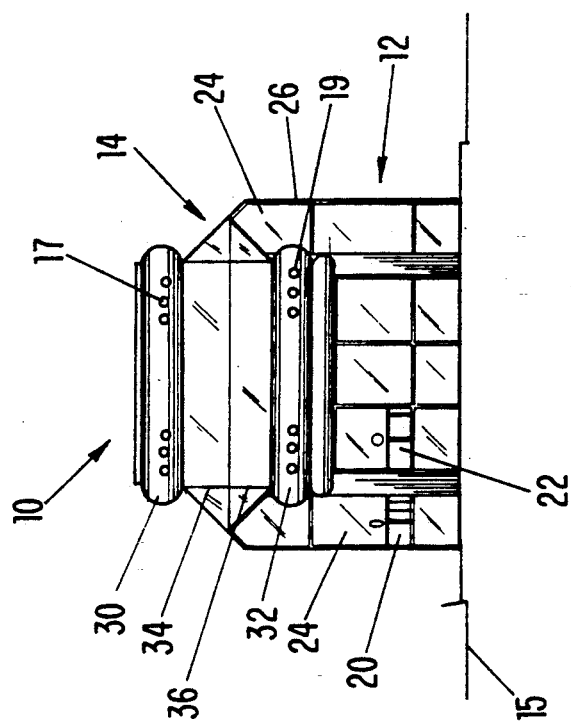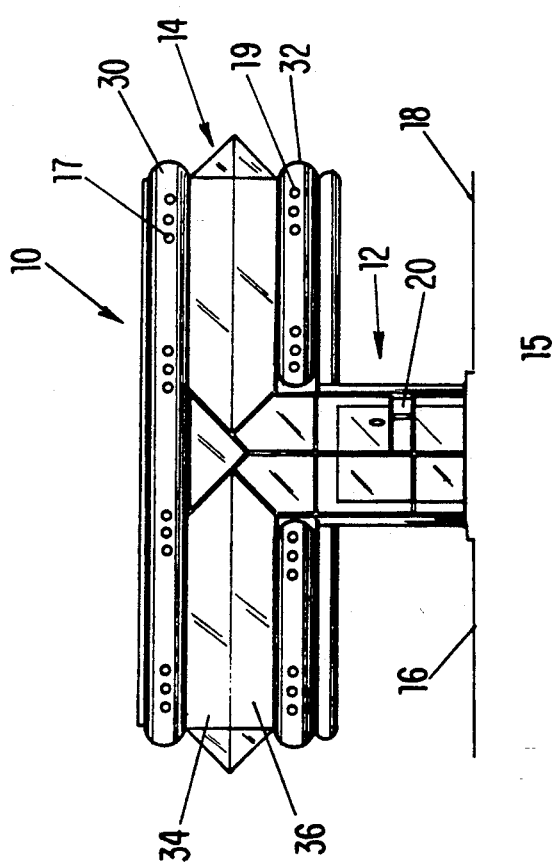

FOOD PREPARATION AND DELIVERY APPARATUS

This is a divisional of co-pending application Ser. No. 07/358,418 filed on May 26, 1989 now U.S. Pat. No. 5,109,956.

BACKGROUND OF THE INVENTION

1. CROSS REFERENCE TO RELATED APPLICATIONS

Related patent applications, entitled BUILDING ASSEMBLY, Ser. No. 07/358,182 now U.S. Pat. No. D 327,129; ADJUSTABLE AND RETRACTABLE MENU AND ORDER DISPLAY UNIT, Ser. No. 07/358,196 now U.S. Pat. No. D 321,724; and BEVERAGE DISPENSER AND SERVICE MODULE, Ser. No. 06/358,186 now U.S. Pat. No. D 331,169, all to Frank R. Casale, Nicola D. Casale, Antonio A. Casale, and Richard P. Bennett are being filed concurrently and on even date herewith, the teachings of which are incorporated herein by reference.

2. Field of the Invention

The invention relates to an apparatus and method for food preparation and delivery and more particularly to an apparatus and method adapted to cook to completion separately precooked and packaged basic food product and separate food items which are selectively combined with the basic food product prior to cooking to completion. The combination is then rapidly cooked to completion for quick delivery of a prepared food product to a patron. The invention also relates to the building and its assembly in which the process is carried out, a retractable menu, and a conveyor delivery structure, a beverage dispenser and a service module.

3. Description of the Related Art

Pizza is traditionally prepared only after a request or order is received. The cooking time for pizza is notoriously lengthy and it is not considered a "fast food" by the public. Usually, a patron of a pizza serving establishment must wait at least twenty to twenty-five minutes after placing an order before the pizza is delivered. This wait discourages many who have time constraints from ordering pizza. In addition, each pizza is generally somewhat individually made in that a patron chooses which of a plurality of available condiments he wishes on his pizza. Thus, complete pizzas are typically not preparable in advance, although some establishments place pizzas prepared before orders are made under heat lamps or use microwave ovens to prepare pizzas, either of which degrade the quality of the pizza or create unsatisfactory pizzas.

Thus, there is clearly a need for speedier pizza preparation without sacrificing taste or quality. Similarly, there is a need for a building and apparatus to provide for speedier food production.

SUMMARY OF THE INVENTION

In accordance with the preferred invention, there is provided a facility adapted for the delivery of food, preferably pizza, to vehicular drive-up and to walk-up patronage. The facility comprises a base level housing having a preselected floor configuration and floor area, the base level housing being adapted to provide food service to walk-up and drive-up, in vehicle, patrons. A second level housing is positioned atop the base level housing and extends outward therefrom in cantilevered fashion to provide a substantially larger floor area than the floor area of the base level housing. The base level housing preferably comprises transparent walls to provide a see-through appearance. The second level housing is adapted for the preparation of food by personnel disposed therein, providing for the food to be served from the base level housing. The second level housing is preferably provided with a supply delivery port for receiving supplies directly from a delivery vehicle. A conveying means is provided for conveying the prepared food from the second level housing into the base level housing for delivering the food to personnel disposed in the base level housing. The conveying means preferably is structured to deliver prepared food to individuals disposed on either side thereof within the base level housing and is preferably a conveyor belt.

The preferred conveyor of the invention comprises an upright frame for supporting a sprocket and chain assembly, the sprocket and chain assembly including an upper sprocket assembly and a lower sprocket assembly, each of which sprocket assemblies preferably include a pair of spaced sprockets on a sprocket shaft, and a pair of parallel chains engageable with said sprockets. The chains further preferably support a plurality of conveyor trays swingably affixed to the chains, each of which conveyor trays may be foldable downwardly when being conveyed upwardly on the chains and further extend outwardly substantially horizontally when being conveyed downwardly. Each of the trays of the preferred embodiment have a plurality of outwardly extending fingers extending from a base of the tray, and an off-loading ramp disposed to receive food conveyed downwardly on the trays and transport the food away from the conveyor. The off-loading ramp of the preferred embodiment comprises a plurality of elongate rollers disposed parallel to said fingers of the conveyor trays and further disposed in an inclined orientation. The rollers are further disposed such that the conveyor tray fingers pass between the elongate rollers of the off-loading ramp. Thereby food items on said trays are received by the elongate rollers of the off-loading ramp and subsequently roll down the off-loading ramp on rollers away from the conveyor trays.

The facility may comprise a plurality of lights positioned upon at least one of the housings and means for repetitively sequentially illuminating individual ones of the plurality of lights to provide the facility with an illusion of rotational movement, and preferably relative rotational movement of the second level housing relative to that of the base level housing.

The facility preferably comprises a plurality of vertical support columns substantially disposed within the base level housing and preferably cylindrical and tubular in shape, which substantially support the structure of the invention. Conduits such as those of water, electricity, sewage, gas, and roof drainage are disposed in one or more of the support members. At least one, and preferably two, of the support members comprise beverage dispensing means and more preferably beverage dispensing and service modules. Preferably, beverage providing reservoirs are positioned in the second level housing and conduits for delivering beverage from the beverage reservoirs are provided between the beverage reservoirs and the beverage dispensing modules through the vertical support members containing the beverage dispensing modules. An ice dispenser can also be provided within the beverage dispensing module. The tubular structural member further comprises at least one, and preferably more than one, beverage cup dispenser means disposed therein. The tubular structural member further preferably comprises a sink and drain means disposed therein for collecting waste beverages and transmitting waste beverages or other liquids into a drain. Cash registers and cash drawers, or other equipment, can be supported on pods swingably attached to the structural member for use by service personnel stationed at the tubular structural member.

The preferred invention further comprises a menu structure remote from the facility and for use by drive-up patronage. The menu structure is preferably vertically adjustable in height to accommodate drive-up patronage within vehicles having different seating and window heights, thereby allowing for adjustable positioning of the menu display and speaker height to accommodate a drive-up patron. The menu structure is preferably essentially, completely retractable into the surface from which it extends to protect it from vandalism when not in use. Preferably a monitor viewable by the drive-up patron shows the service person within the facility accommodating the patron and stationed at the beverage dispensing and service module.

The invention preferably comprises a remotely locatable, protectable menu and order display unit, comprising an outer housing and an inner housing, which inner housing comprises menu means and communication means for communicating with a remote location. The inner housing is cooperably slidable within said outer housing, and comprises means for selectively and alternatively extending and retracting the inner housing with respect to the outer housing. The inner housing further preferably comprises cover means engageable against one end of the outer housing means, which is made of sufficiently hardened and durable construction as to be resistant to damage by vandalism. The inner housing and outer housing are preferably cylindrically tubular in configuration and are concentrically disposed with respect to one another in an upright orientation. The outer housing is preferably embedded in a concrete base in the ground; when the inner housing is downwardly retracted, the top of said inner housing is substantially flush with the level of the ground or the surface of the concrete base. The unit provides means for selectively and alternately retracting and extending the inner housing; this means preferably comprises an AC motor coupled to the inner housing through a drive screw and worm drive. Control means at the remote location or associated with the inner housing permits selective adjustment of the height of the inner housing during use by a patron. The remotely locatable, protectable menu and order display unit preferably further comprises a combined speaker and microphone unit, and a video display unit for displaying the face of a person remotely located and in communication with a patron through said combined speaker and microphone unit.

The preferred invention further comprises a multi-purpose structural column for a multi-story food and beverage dispensing facility of the invention. The column may comprise a tubular structural member, which includes an opening therein at a level corresponding to the level of a service window of the facility, and beverage dispensing means disposed within the tubular structural member and positioned within the opening in the structural member. The beverage dispensing structure may further include a plurality of beverage dispensers supplied by beverage supply lines extending downward from an upper story of said multi-story food and beverage dispensing facility, and sink and drain means for carrying waste beverages downwardly through and out of the structural member. The multi-purpose structural column further comprises cup dispensers disposed within the structural member for retaining and dispensing a plurality of cups within structural member. The cup dispenser means preferably extends upwardly to a second story of said facility, whereby the cup dispenser means may be replenished with cups either by personnel located in said second story of said facility or by a service person stationed at said service window.

The preferred multi-purpose structural column of the invention further comprises at least one pod swingably attached to said structural member adjacent to the opening in the column, which pod may be adapted for supporting equipment for use by service personnel stationed at the column. The pods are useful in supporting equipment such as a cash register or cash drawer. The multi-purpose structural column further comprises a camera affixed to the structural member and positioned to monitor a service person stationed at said service window for transmission to a monitor screen at a remote menu and ordering location.

The preferred invention also comprises a food conveyor for conveying food from the upper story to the lower story of the multi-story food and beverage dispensing facility. The conveyor preferably comprises an upright frame means for supporting a sprocket and chain assembly, which preferably further includes an upper sprocket assembly and a lower sprocket assembly, each of said sprocket assemblies including a pair of spaced sprockets on a sprocket shaft, and a pair of parallel chains being engaged with said sprockets, said chains supporting a plurality of conveyor trays swingably affixed to said chains. Each conveyor tray is preferably foldable downwardly when being conveyed upwardly on the chains of the assembly and extending outwardly substantially horizontally when being conveyed downwardly on the chains. Each of the trays have a plurality of outwardly extending fingers extending from its base, and an off-loading ramp disposed to receive food conveyed downwardly on the trays and transport the food away from the conveyor. The food conveyor comprises an off-loading ramp further comprising a plurality of elongate rollers disposed parallel to the conveyor tray fingers and further disposed in an inclined orientation. The rollers of the assembly are further disposed such that the fingers of the conveyor trays pass between elongate rollers of the off-loading ramp, whereby food items on trays are received by the elongate rollers of the off-loading ramp and subsequently roll down said off-loading ramp on said rollers away from said conveyor trays. The off-loading ramp is preferably peaked at the center of the conveyor and is inclined downwardly in both directions therefrom, whereby food items carried from the conveyor trays to the off-loading ramp may roll away from the conveyor trays in two directions. The elongate rollers of off-loading ramps each preferably comprise a narrow shaft having a plurality of small rollers journalled thereon. The food conveyor chains are preferably driven by a motor engaged with the upper sprocket shaft of the conveyor.

The preferred invention further comprises a method for delivering food within a very short time period to walk-up and drive-up restaurant patrons. The method comprises the steps of preparing a basic food product for cooking, partially cooking the basic food product between about 60 percent to about 90 percent of its full cooking requirement, preferably between about 65 percent and about 85 percent, and most preferably between about 70 percent and about 80 percent of its full cooking requirement. The partially cooked basic food product is then packaged for future cooking completion. Additional optional food items are then prepared and packaged for future use in the final product prior to its cooking completion. These steps can be completed at the same site where final food preparation is made or at a remote site. When the final food product is ordered by a patron, the partially cooked basic food product is removed from its package and the additional optional food items selected by the patron are removed from their packages and added to the now unpackaged basic food product to obtain a combination. The combination is cooked preferably using moving hot air to completion in less than about two minutes, preferably in about one minute, and most preferably in about thirty seconds within this step. The basic food product can comprise a basic pizza comprising a pizza shell, pizza sauce, and cheese; the combination comprises the basic pizza and the selected additional optional food items comprising pizza condiments.

It is therefore one object of the present invention to provide quicker individualized food preparation, particularly pizza preparation, after an order is placed.

Another object of the invention is to provide a unique food product delivering facility.

It is another object of the invention to provide an easily viewable menu to drive-up patrons in vehicles of various driver seating and window heights.

Yet another object of the invention is to provide a quickly assemblable and disassemblable building having relatively little ground contact, or a small "footprint," and which requires minimal lot space.

Still another object of the invention is to provide a unique soft drink dispensing structure and method.

Yet another object of the invention is to provide a conveyor which will deliver food conveyed thereon to opposite sides.

One advantage of the present invention is that in accordance therewith, food, including pizza, can be quickly and simultaneously prepared and delivered to a patron.

Another advantage of the instant invention is that a building in accordance therewith can be readily set up as well as removed from a site.

Another advantage of the invention is that a basic food product and condiments can be partially cooked and separately packaged on site or at a remote site without sacrificing the quality of the resulting food product.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings:

FIG. 1 is a drive-up or walk-up patron's front view of a building in accordance with the invention;

FIG. 2 is a side view of the FIG. 1 building, showing both drive-up and a walk-up service window;

DETAILED DESCRIPTION OF A PREFERRED EMBODIMENT OF THE INVENTION

The preferred building embodiment of the invention is illustrated in FIGS. 1-8 and 15.

Figure 4:
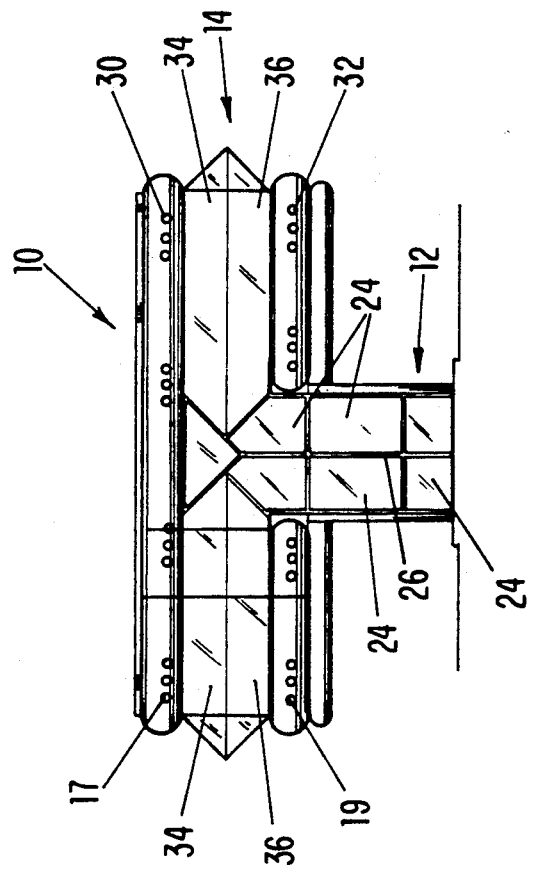
FIG. 4 is a back view of the building.
Figure 3:
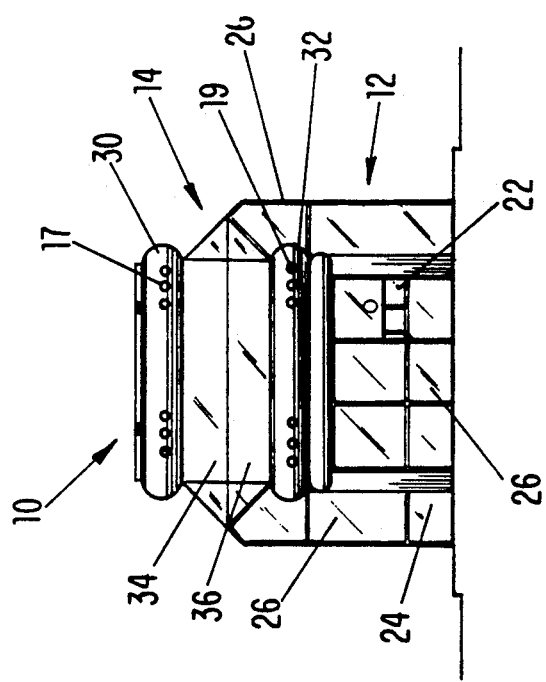
FIG. 3 is a side view of the other side of the FIG. 1 building, showing a second drive-up service window.
Figure 5:
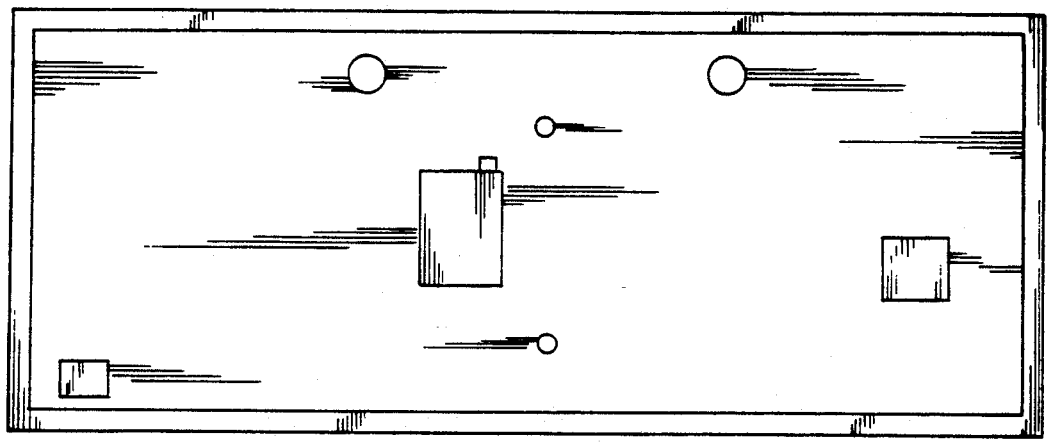
FIG. 5 shows the roof of the building.
Figure 6:
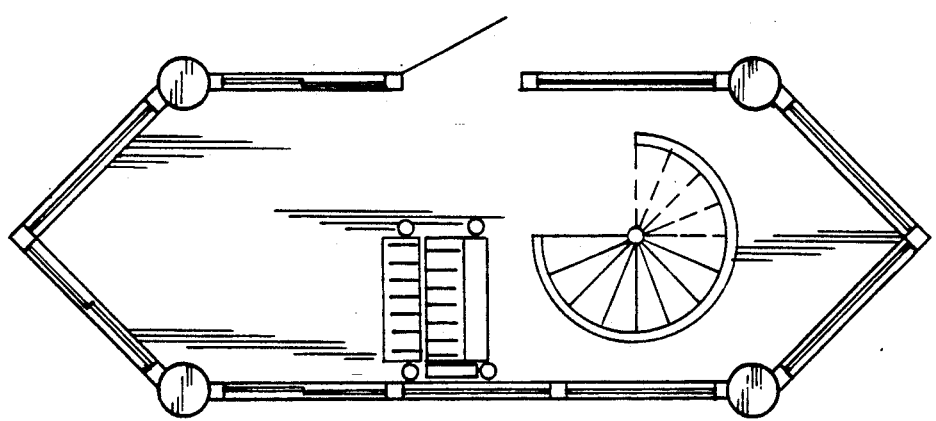
FIG. 6 depicts the layout of the base level or first floor of the building.
Figure 7:
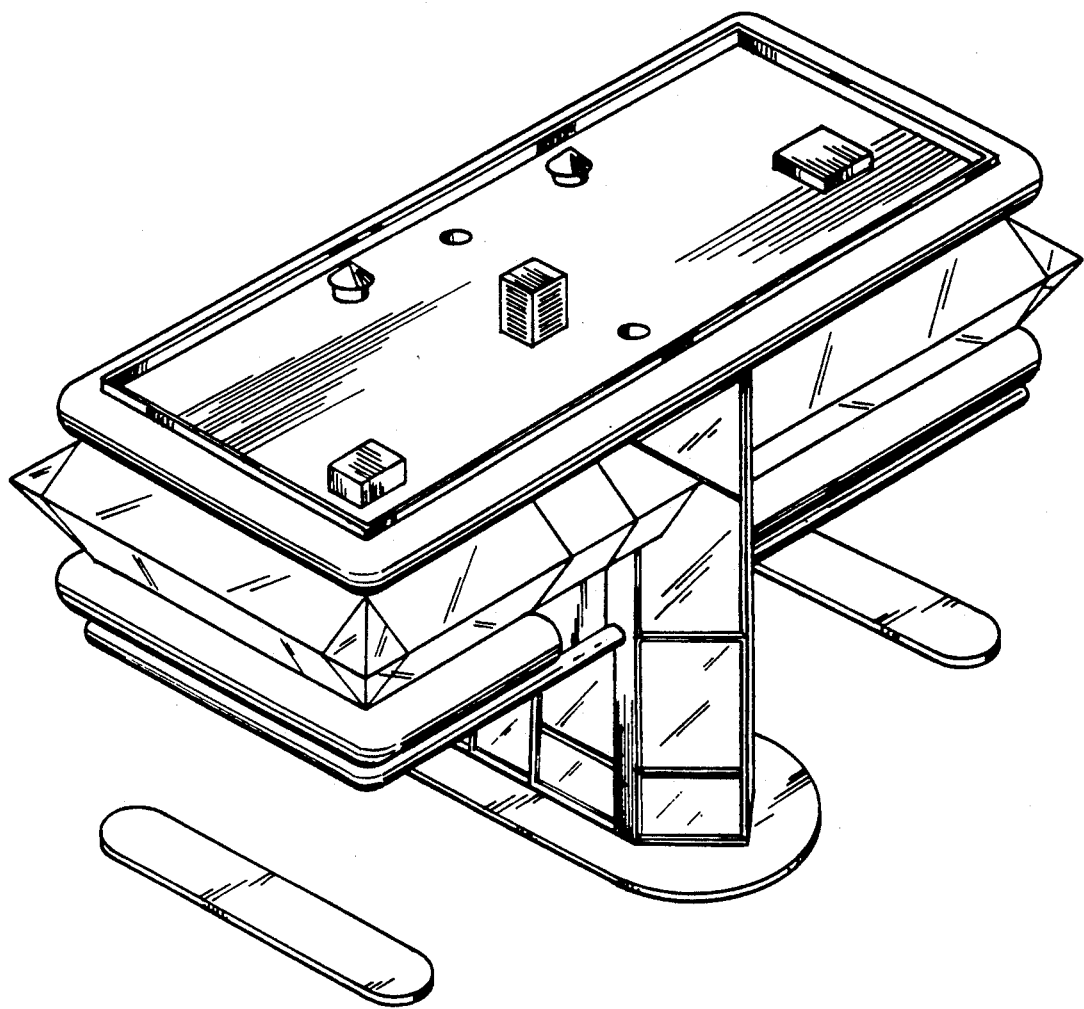
FIG. 7 perspectively depicts the building.
Figure 8:
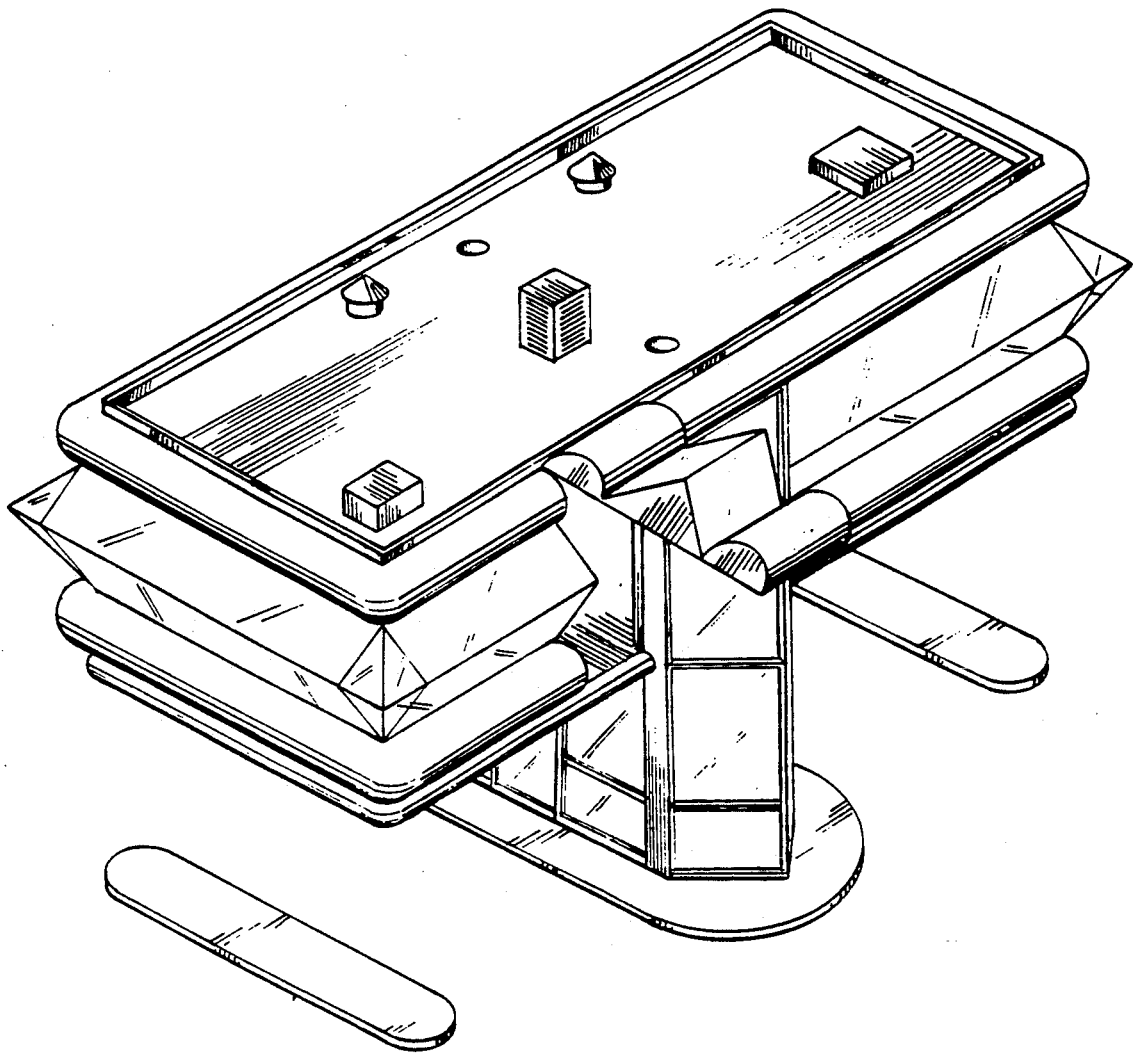
FIG. 8 shows the building as seen in FIG. 7, but with its second level or upstairs delivery door open.
Figure 15:
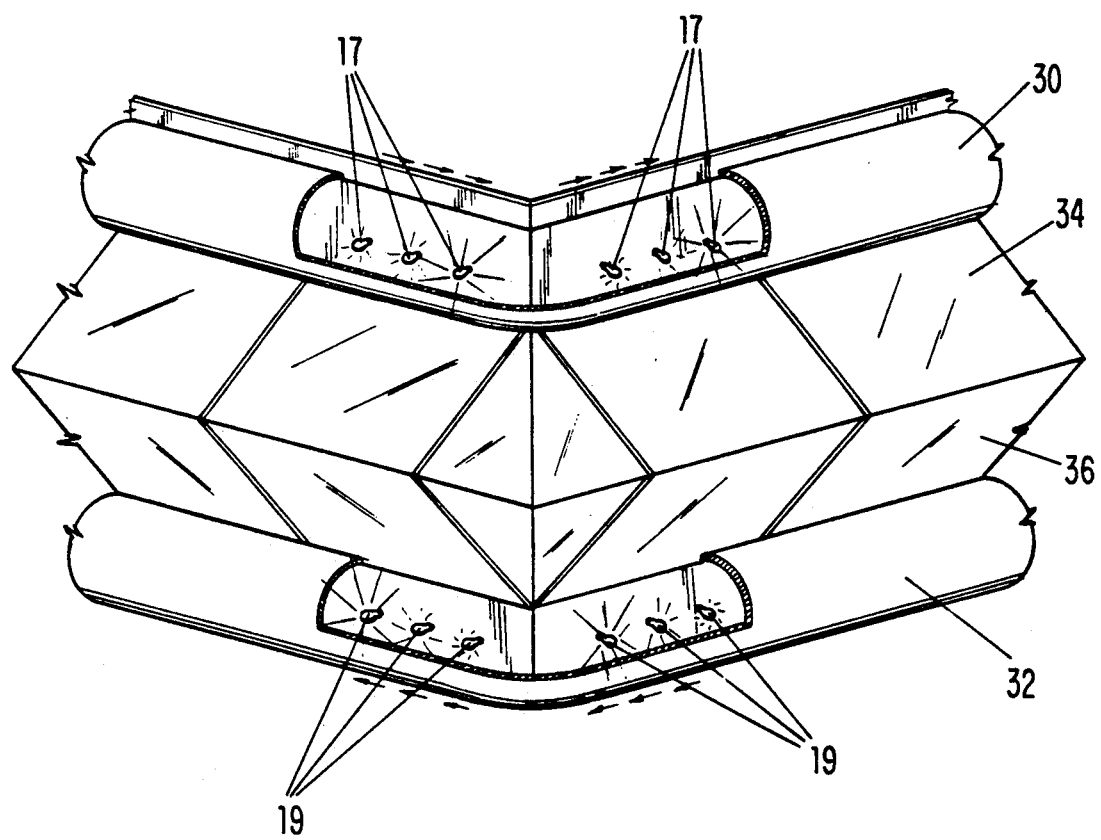
FIG. 15 shows a large, fragmentary view of the lights showing a plurality of horizontally positioned lights within the tubular elements of the FIG. 1 embodiment, which lights may be sequentially flashed or illuminated to give the illusion of rotation of the building.

FIG. 1 shows a drive-up or walk-up restaurant patron's initial front view of the preferred building in accordance with the invention. FIGS. 2, 3, and 4 illustrate side and rear views of the building. FIG. 5 illustrates the roof of the building. FIG. 6 shows the base level of the building. FIGS. 7 and 8 are perspective views of the building. FIG. 15 shows a large, fragmentary view of the lights showing a plurality of horizontally positioned lights within the tubular elements of the FIG. 1 embodiment, which lights may be sequentially flashed or illuminated to give the illusion of rotation of the building.

As seen in FIGS. 1-8 and 15, the building 10 comprises a base level housing 12 in which and through which the food service is provided to the patron and a second level housing 14 positionable atop the ground or base level housing 12 and extending outwardly therefrom in cantilevered fashion. The second level housing 14 has a much larger floor area than the base level housing 12 and extends over drive-up lanes 16 and 18. In the preferred embodiment, a walk-up window 20 is provided at either or both ends of the base level housing 12 and is seen in FIGS. 1 and 2. Drive-up windows 22 are disposed on either side of the base level housing 12, as shown in FIGS. 2, 3, 7 and 8. FIGS. 7 and 8 show traffic channeling islands 40 disposed to direct vehicles through the drive-through lanes 16 and 18 closely past the drive-up windows 22.

The preferred building 10 of the invention is buildable off-site, and transportable on a truck bed in two parts, the base level housing 12 and the second level housing 14. The building 10 is easily assembled on a site, such as a shopping center parking lot. If a site change is desired for any reason, the building 10 is easily disassembled into housings 12 and 14 and moved to another site or stored for later use. Indeed, normally assembly of the base level 12 and the second level 14 will be done off site and the two levels trucked to the site. Base level housing 12 sits atop a slab 15 which preferably comprises concrete, but which can comprise any suitable hard substance for supporting a building of this nature. The ground contact or "footprint" of base level housing 12 is small, about the size of a typical parking space. The columns 28 and 29, seen in FIG. 6, are bolted to a slab located at the site and the second level 14 is welded to the top of the columns 28 and 29, hereinafter described. Disassembly is accomplished by cutting columns 28 and 29 with a cutting torch near the top of the first level 12 at or near where they were welded in assembling the two levels. The second level 14 can then be lifted off the base level 12 and removed. The columns are then unbolted from the slab and the first level removed. The upper level 14 extends out over the twin drive-through lanes 16 and 18. Thus, the space needed for the building "footprint" and the drive through is uniquely minimal for the amount of food service providable. The base level 12 comprises large panes of glass 24 in metal framing 26. The frames 26 and the glass 24 do not support the second level 14. Support is essentially provided by the four hollow steel columns 28 and 29, seen from their tops down in the top view of base level housing 12 shown in FIG. 6. At least one of the columns 28 contains electrical service, gas, water, sewage, roof drain pipes, and the like. Usually, both columns 28 will be so utilized.

A view of the roof of second level housing 14 of the preferred embodiment is seen in FIG. 5 and the relative size thereof can be compared to the base level seen in FIG. 6. However, the housing of FIGS. 5 and 6 are turned ninety degrees to one another from how they are shown during the assembly of the preferred embodiment. The top level 14 preferably comprises horizontally disposed tubular elements 30 and 32 and glass elements 34 and 36 as seen in FIGS. 1-4, 7, and 8. In the preferred embodiment, the glass elements 34 comprise reflective mirror-like glass and elements 36 comprise darkly shaded see-through glass. Also in the preferred embodiment, tubular elements 30 and 32 are tinted two different colors and each display a plurality of horizontally positioned lights 17 and 19 which are sequentially flashed or illuminated (see large fragmentary view of FIG. 15). In darkness, the lights can give a viewer the illusion that the building is rotating. In the preferred embodiment, the lights sequence in opposite directions (see arrows indicating direction of sequence) on elements 30 and 32 to give the illusion of the lights travelling in one direction on 30 and in the other direction on 32. However, the lights could be sequenced to travel in the same direction, and can be of the same or different colors in either one or both of elements 30 and 32, as well as positioned as desired by a user to further give the illusion of movement. Alternatively, only one of elements 30 or 32 could be provided with lights.

As can be seen in FIGS. 7 and 8, a food and supply delivery hatch 42 is preferably provided, the hatch having a door 43 seen in the closed position in FIG. 7 and in the open position in FIG. 8. Door 43 is designed to open when a truck with an extendable bed drives up and supplies are delivered directly into the second level housing 14, much as an airliner is loaded with its supplies. Hatch 42 saves carrying the supplies up a stairway (an alternative in accordance with the invention), such as circular stairway 44 (shown in FIG. 6), which is provided for the operators of the facility to go between the base level 12 and the second level 14. Although door 43 is shown hinged at its top to the second level 14, it could be hinged or attached by other means at its base, or on either side, as desired.

Figure 9:
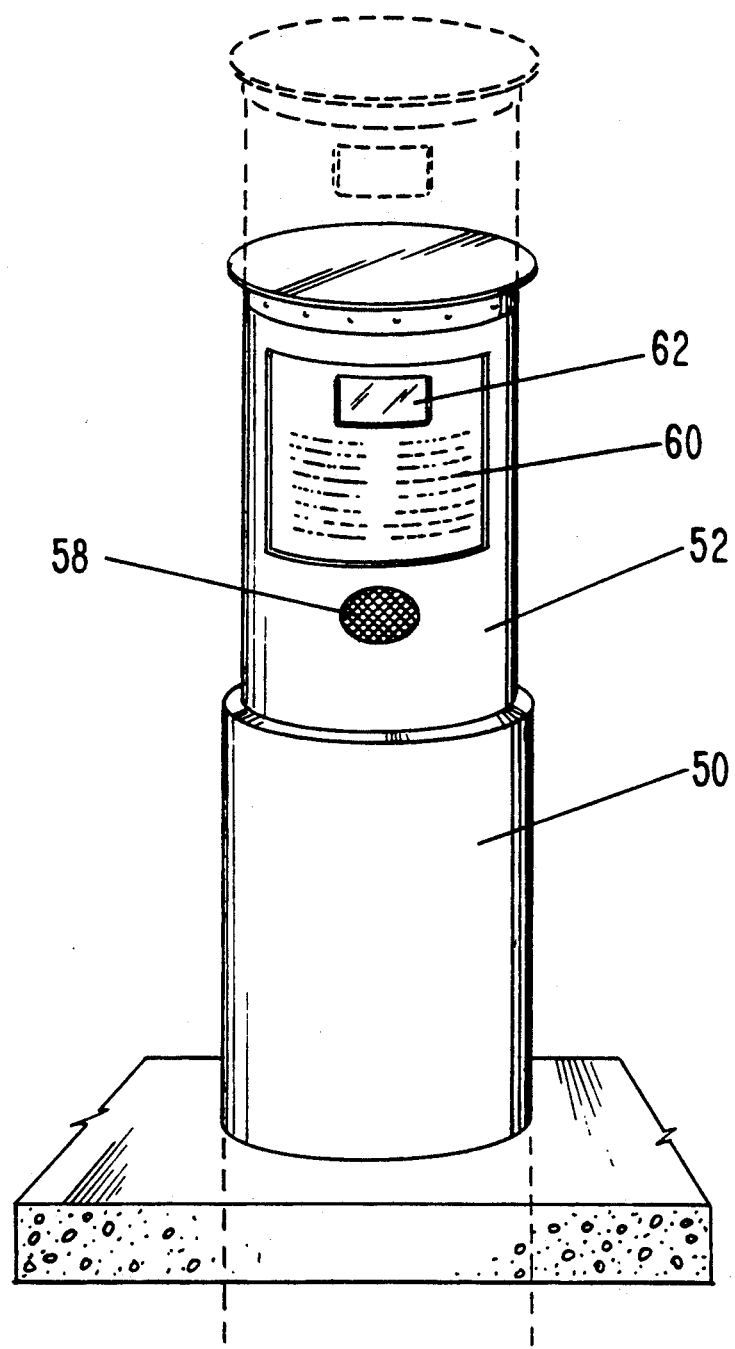
FIG. 9 illustrates an adjustable and retractable menu and order display unit in a position for use.
Figure 10:
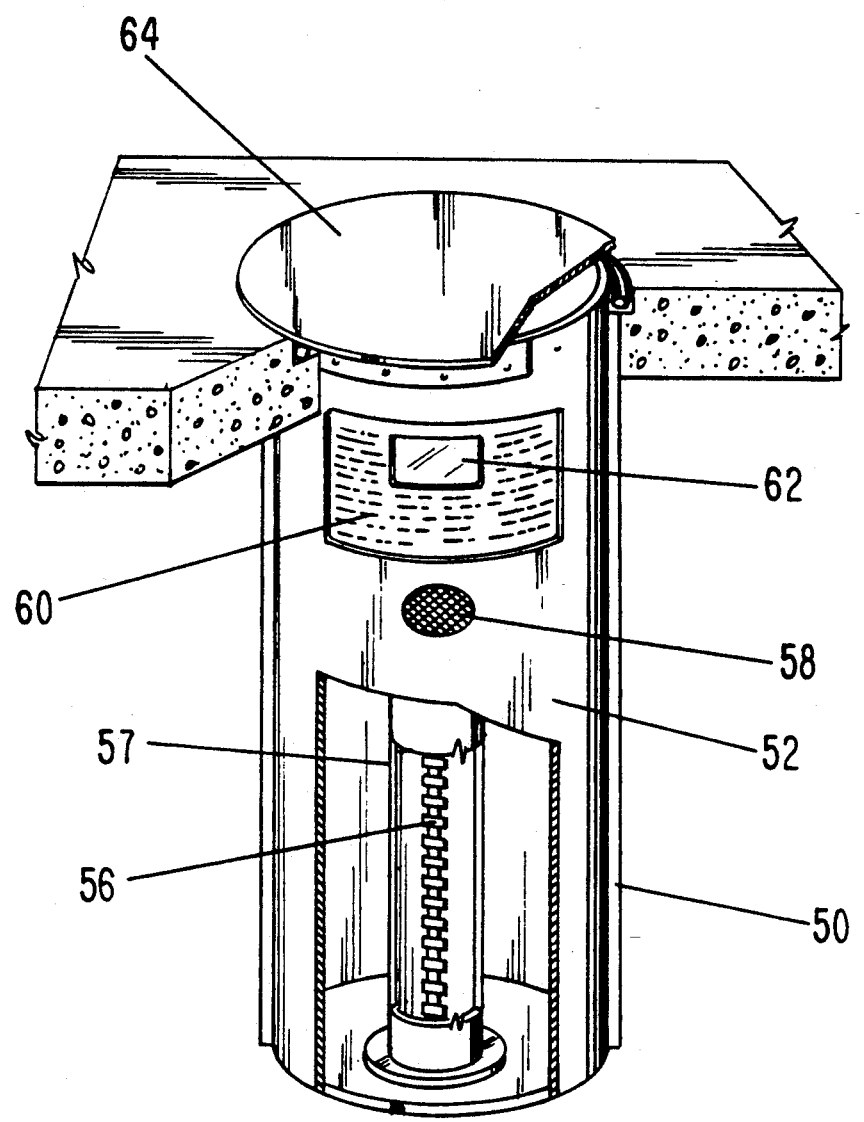
FIG. 10 shows a partially cutaway view of the menu and order display unit of FIG. 9 retracted for storage.
Figure 11:
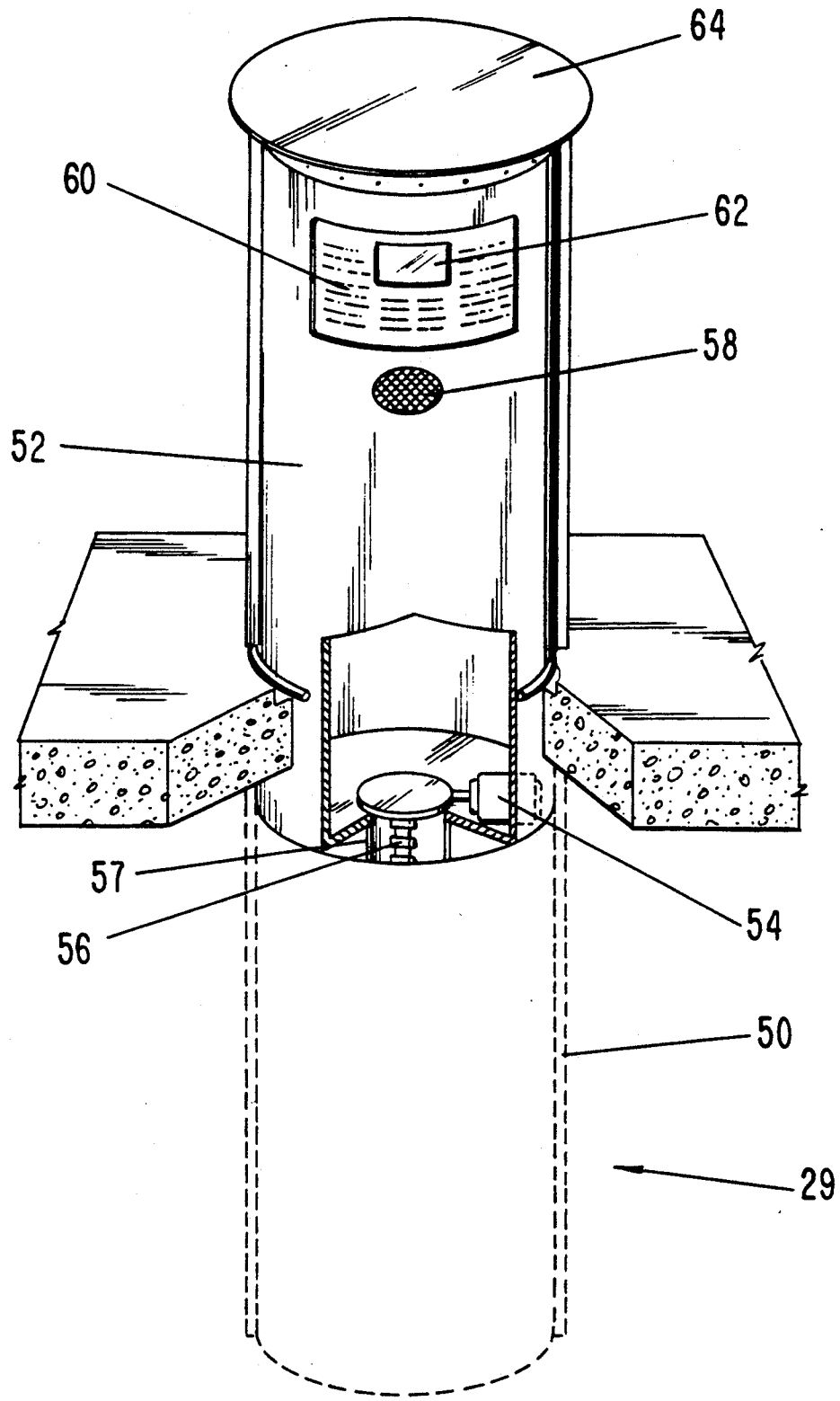
FIG. 11 is a partially cutaway view of the menu and order display unit of FIGS. 9 and 10 in position for use.

FIGS. 9-11 shows a preferred embodiment of a remotely locatable, protectable menu and order display unit. One or several menu and order display units are disposed on the lot containing the building 10, preferably in drive-through lanes 16 and 18. The menu and order display unit is adjustable to the height of the driver or other ordering individual in the drive-up vehicle, as seen in FIGS. 9 and 11, and retractable into a storage position as seen in FIG. 10. The height of the menu and order display unit may be adjusted by the driver or preferably by the cashier or person taking the order (see FIG. 12) or by the patron (not shown). The inner housing 52 and outer housing 50 of the substantially cylindrical tubular configuration are concentrically disposed with respect to one another in an upright orientation. The outer housing 50 further is embedded in a concrete base in the ground. When the unit is in use, an outer housing 50 slidably engages with an inner housing 52, the outer housing 50 remaining in a fixed position and the inner housing 52 being adjustable through means such as an AC motor 54 and drive screw and worm drive 56 in steel frame 57. Although the preferred embodiment is cylindrical in shape, those skilled in the art will recognize the housings 50 and 52 can be square, oval, rectangular, hexagonal, and the like, in cross section. A speaker/microphone 58 is provided and a menu 60 is displayed as seen in FIGS. 9-11. A monitor, such as a television display 62 is preferably provided to show the face of the cashier or person taking the order within the base level housing 12 of the facility 10. FIG. 10 (and dashed lines in FIG. 11) shows the menu system in overnight, or out of use, storage within the ground, lowered by means such as the AC motor 54 and drive screw and worm drive 56. A plate or cover 64, made of a hard material, such as steel, 64, which is similar in appearance to a manhole cover and which deters vandalism, is preferably provided.

Figure 12:
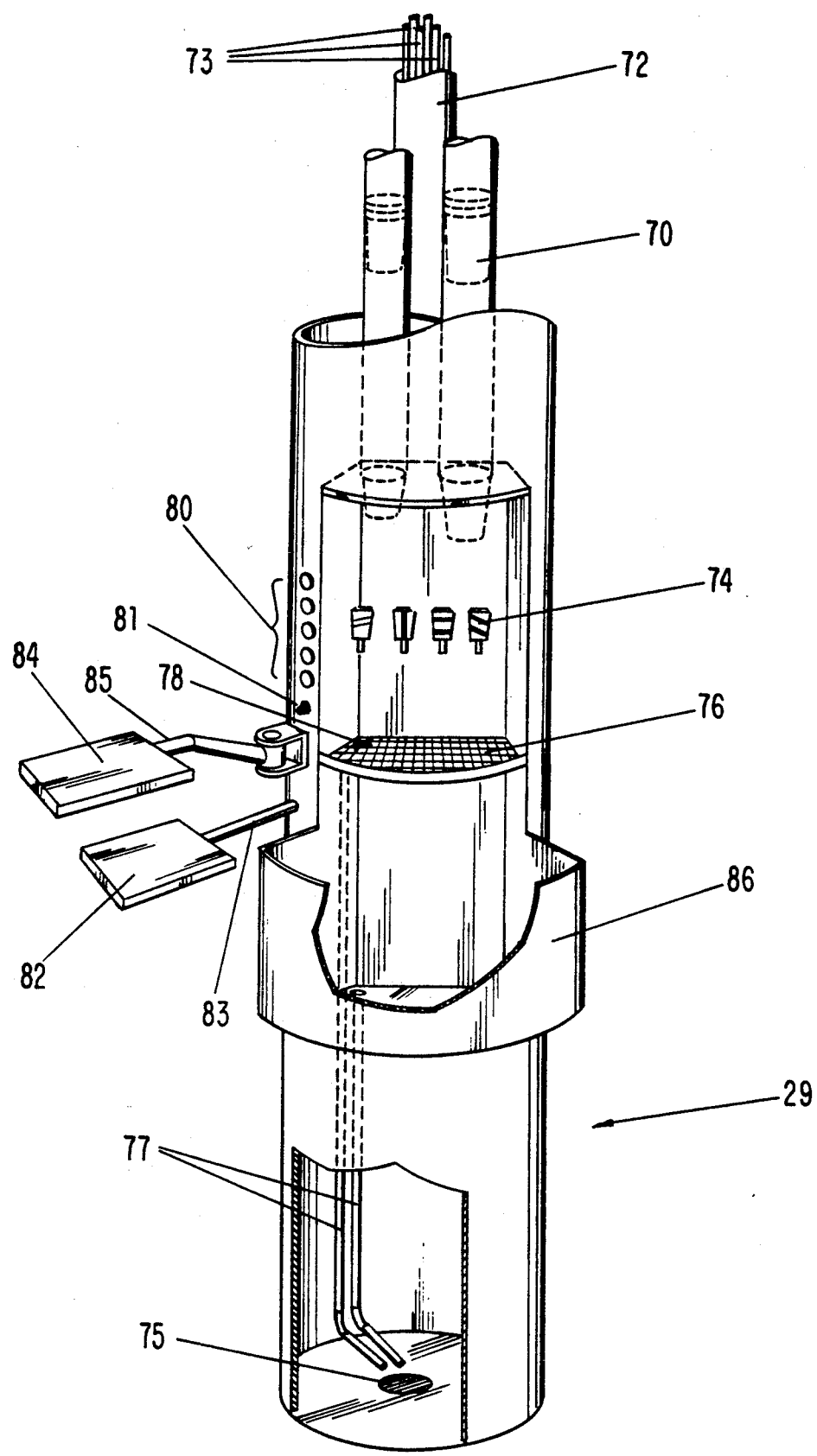
FIG. 12 depicts in a partially cutaway view an in-column beverage dispenser and cashier module in accordance with the invention.

FIG. 12 shows a preferred beverage dispenser/cashier module of the invention, disposed in one of the support columns 29 (see FIG. 6). In the preferred embodiment, the other columns 28 and 29 contain a similar beverage dispenser and/or electrical, water, sewage conduit, and the like. Separation of the beverage dispenser from the other various conduits provides a sanitary environment. Incorporating the beverage dispenser/cashier module, and the various conduits in columns 28 and 29, adds to the aesthetic appearance of the facility, as none of this is readily visible, and assists in providing a safe and hygienic environment for service personnel and patrons. Cups are stacked in cup dispensers 70, which extend upward into the columns. Thus, cups can be replenished in dispenser 70 from personnel in the lower level housing 12 or from those in upper level housing 14, if desired. Insulated beverage conduits comprising, for example, six lines 73, extend down from the second level 14 and provide water, beverage, soda, or the like, to the module and its recirculating dispenser valves 74 from reservoirs in level 14. Preferably, water is recirculatable upward through one of these lines. The service person, stationed in the base level 12 at the module, can readily dispense water, soda, or other beverages into cups provided by the cup dispensers 70. A sink 76 having an overflow drain 78 is preferably provided to allow excess soda, beverage, water, ice, and the like, to drain from the column 29 through lines 77 into a drain 75 or other disposal. An insulated ice bin 86 is provided, but alternatively, an ice dispenser connected to the water line in the conduit 72 may be incorporated within the column 29, for use by the beverage serving person. Control buttons 80 for "menu-up," "menu-down" and "menu-stop" functions are preferably disposed, as seen in FIG. 12, on the side of the in-column module. At least one control button 80 may be used to control an appropriately mounted television camera (not shown) focused on the face of the cashier at the module. A communications microphone plug-in jack 81 is also preferably provided. Shelves 82 and 84 are connected to adjustable pods 83 and 85. Shelves 82 and 84 are useful for holding equipment, such as a cash drawer disposed on a pod 83 and movably mounted on one side of the column 29, or a computerized cash register 84 or the like disposed above and on the same side of the column, on adjustable pod 85. The drink dispensing and service module is conveniently positioned relative to walk-up and drive-up windows 20 and 22 so that the service person can take orders, communicate them through a microphone, television system, or the like (not shown), to food preparation personnel in upper level 14, prepare and serve beverages, take money, make change, and the like, without moving away from the module. The electrical components and circuitry used are well known to those skilled in the art.

Figure 13:
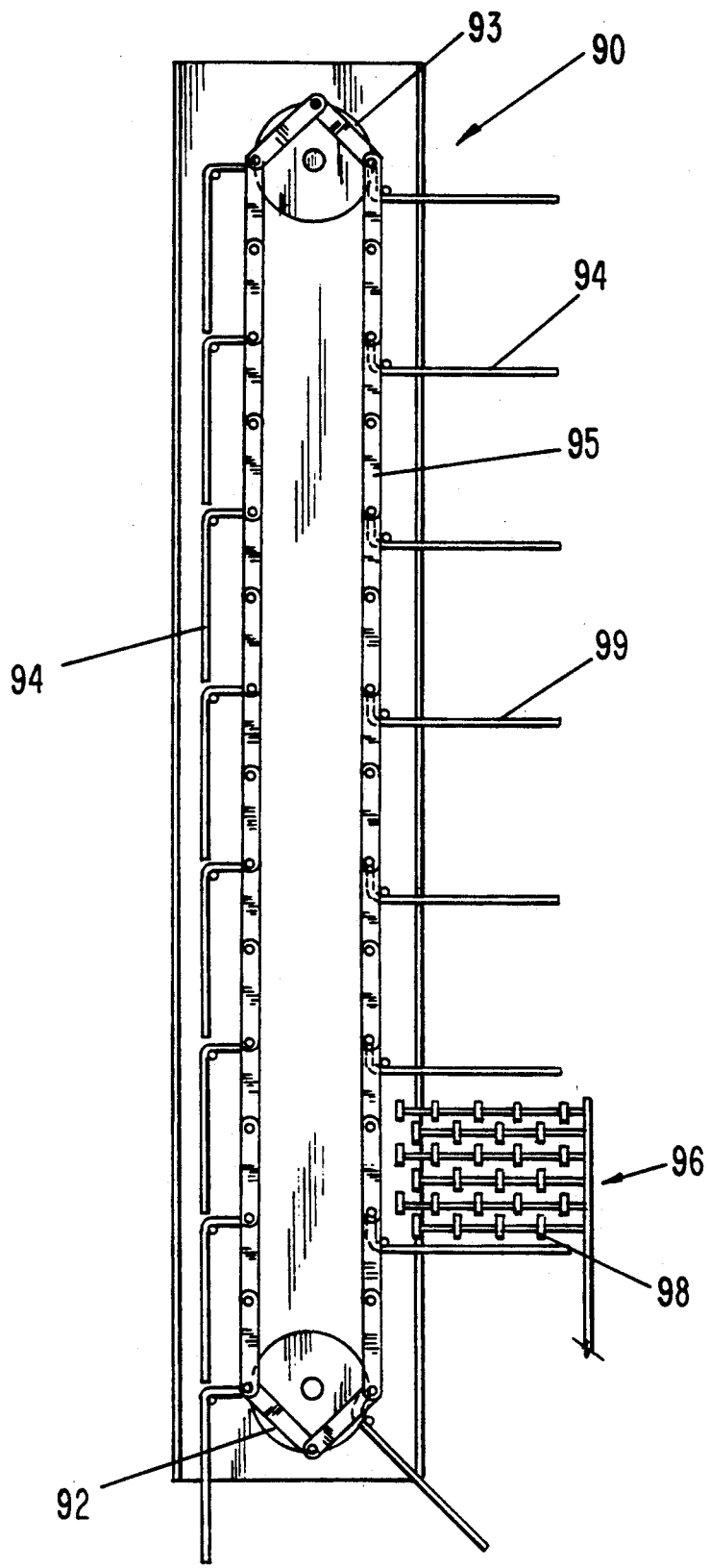
FIG. 13 is a side view of the conveyor/elevator structure of the preferred embodiment.
Figure 14:
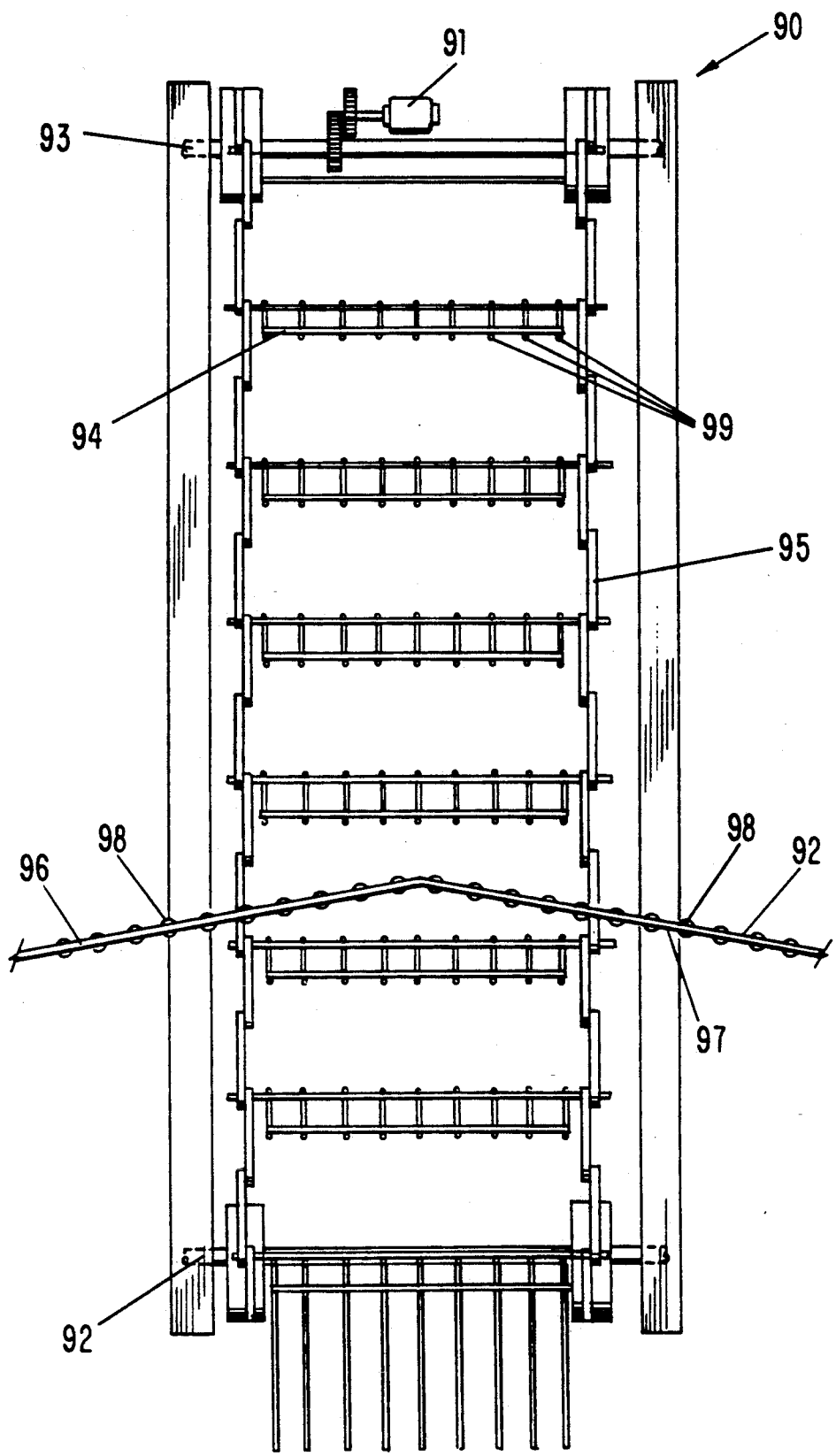
FIG. 14 is a front view of the conveyor/elevator structure of FIG. 13.

In the preferred embodiment, a conveyor or elevator 90, shown in more detail in FIGS. 13 and 14, communicates between the second level housing 14 and the base level housing 12. Food, such as pizza and salad, is prepared in the second level housing 14 and transported to the service personnel in the base level housing 12 via the conveyor 90. A motor reducer combination 91 preferably drives conveyor 90, although it can be run by hand. The food conveyor 90 comprises an upright frame construction as shown in FIG. 13, which frame supports a sprocket and chain assembly 92, which further comprises an upper sprocket assembly 93 and a lower sprocket assembly 92. Each sprocket assembly includes a pair of spaced sprockets 95 on a sprocket shaft. The conveyor runs between end sprocket-shaft combinations 92 and 93 located on the lower and upper levels, respectively. Conveyor trays 94 are arranged between links 95. Off-loading ramps 96 and 97 are peaked at the center of the conveyor and inclined downwardly in both directions therefrom, whereby food items carried from said conveyor trays 94 to off-loading ramps 96 or 97 may roll away from the conveyor trays 94 in both directions. Off-loading ramps, further having elongated rollers 98, are positioned to off-load food products from conveyor trays 94, to either side of the conveyor 90, to the appropriate service personnel in the lower level housing 12. The elongate rollers 98 further comprise a narrow shaft having a plurality of small rollers journalled thereon. Thus, food preparation personnel in the upper level housing 14 position a food product on the side of a tray 94 to downwardly convey and off-load the product onto either ramp 96 or ramp 97, to conveniently reach the appropriate requesting person stationed at the appropriate in-column module in the base level housing 12. The food product will roll on rollers 98 to come within the reach of the appropriate person at a column 29 station. The conveyor trays 94 comprise fingers 99 (see FIG. 14) which pass between the rollers 98. The trays 94 are preferably hinged as shown in FIG. 13 to point down from gravity on their return trip up. The trip of a conveyor tray 94 from the upper level housing 14 to the lower level housing 12 preferably takes from about 6 to 8 seconds. As seen in FIG. 6, two columns 29 are provided so that two order takers/cashiers can be working simultaneously, one for each walk-up/drive-up window 20, 22 combination. Conveyor 90 splits the order on either side at its destination in base level 12 onto off-loading ramp 96 or 97, which delivers the order to the ordering cashier.

In accordance with the preferred process of the invention, food, such as pizza, is substantially prepared and packaged in advance. After an order is received, the food is then quickly (within a matter of less than five minutes, preferably less than two minutes, and most preferably less than one minute), prepared for consumption and delivery to the customer, so that the preferred embodiment of the invention can serve as a fast food restaurant to patrons—something heretofore not available for pizza. The food is prepared within the second level housing 14, conveyed to the service personnel in the base level housing 12, and handed to the customer.

There are two preferred basic procedures for food preparation, such as pizza preparation, in accordance with the invention. The first process comprises substantial preparation of food in a commissary, which may be away from the housing apparatus. Alternatively, all food preparation can occur within the second level 14 of the housing apparatus.

If there are a plurality of housings (e.g., a plurality of fast food retail outlets), each outlet, as seen in FIGS. 1 through 8, can order supplies and food periodically, such as daily, by computer. Deliveries are preferably made through a supply delivery port or door 43 and hatch 42 in the building by refrigerated truck on a daily basis. A hydraulic lift on the truck lifts the truck bed to the second floor level 14 to provide the supplies and/or substantially prepared food, if prepared at the commissary, through the hatch 42 and door 43 (see FIGS. 7 and 8).

Food, particularly pizza, is preferably substantially prepared in accordance with the invention prior to placement of an order by a patron. Food preparation may occur at a remote location or commissary or on site at the building 10.

The preferred process of substantially preparing food at a commissary is as follows. In this process, the dough is mixed in a very large (e.g., a substantially 550-pound) batch; the dough is then passed through an extruding machine which sheets the dough to the desired thicknesses and places it on a conveyor. The dough sheet is then cut with a die into pizza shells of selected size(s). A second die is used to form a crust edge around the pizza shells. The pizza shells continue on the conveyor to a sauce depositor which deposits and spreads appropriate amounts of sauce on each pizza shell. The partial pizza continues to a cheese shredder and depositor which covers the pizzas with premeasured amounts of cheese. The pizzas, still on the conveyor, enter a conveyor oven which bakes the pizzas to approximately sixty to ninety percent, preferably sixty-five to eighty-five percent, and most preferably seventy to eighty percent, of their cooking completion. The pizzas then continue on the conveyor for an approximate one minute cooling period, after which they enter a freezer (e.g., a spiral freezer), which freezes the pizzas in approximately seven to nine minutes. Upon exiting the freezer, the pizzas enter a vacuum chamber which removes substantially all oxygen from the pizzas. Each individual pizza is then vacuum packed. An inert gas, such as nitrogen, is then injected into each package to keep the pizza fresh and inflate the package to prevent the pizza from being crushed while it is handled. The pizzas are then stored in freezers to await shipment to retail outlets. The various toppings are similarly packaged through the freezing, deoxygenating, and vacuumizing steps in order to preserve their freshness and quality. The pizzas and toppings are, when appropriate, loaded on trucks which are sent to individual retail outlets 10. As they are received at an outlet, they are unloaded through the hatch 42 and open door 43 (see FIGS. 7 and 8) into the second level housing 14 and stored frozen until needed. To prepare them for final preparation, the pizzas are individually removed from the freezer and the packaging removed. The pizzas are then placed in evaporative units, which are set at approximately 125° air temperature and approximately 135 percent (%) humidity. In approximately 30–35 minutes, the pizzas are ready for completion of their cooking preparation. From this point on, they are handled as described below, after the customer order is received.

If prepared on site in the second level housing 14, the preferred process for substantially preparing pizzas is as follows. Dough is made fresh on a daily basis and the dough is molded into individually sized amounts and packed in a certain number, such as twenty-eight, pieces to a tray. Pizza sauce is made daily and packaged in a container, such as a three-gallon container. The cheese (e.g., mozzarella) is shredded and diced daily and packaged in, for example, 45-pound containers. The daily preparation is essential to the freshness of the product. The pizza is substantially, but not completely, prepared in accordance with the invention by removing the dough trays from a dough retarder and removing multiple (e.g., six) dough balls from a tray. The dough is placed in a ball on a preferably marble make table and molded by hand into individual (e.g., eight-inch across) dough crusts. Multiple dough crusts are placed on a pizza peel (e.g., a wood plank) and, using a sauce dispenser, premeasured amounts of pizza sauce are placed on each pizza crust. A measured amount of cheese is then placed on each pizza crust. The oven peel is positioned on an oven shelf and the multiple pizzas are slid off. The oven is operated at a temperature of about 475°±30°, and the pizzas are cooked to approximately sixty to ninety percent (e.g., seventy five percent) of completion. In the preferred embodiment, this comprises approximately five minutes in an approximately 475° oven. The pizzas are removed from the oven when their cooking time is up, which is preferably indicated by an alarm sounding. The pizza is cooled on a shelf for approximately one minute at room temperature. The pizzas are then placed in evaporative units.

In this condition in the evaporative units, whether prepared at a commissary or on site, the substantially prepared pizzas are then ready for a patron's order. The patron places his/her individual order as to the type of pizza desired through the menu and order unit speaker (see FIGS. 9–11) or at a walk-up window 20. One of the service personnel in upper level 14 removes the pizza from the evaporative unit, places the requested toppings on the pizza, and positions the pizza in a fast cooking oven, for example, a jet sweep oven which utilizes moving hot air, such as disclosed in U.S. Pat. Nos. 3,884,213 or 4,154,861, to Smith. This oven completes the cooking of the pizza within approximately thirty seconds to provide availability of the fast food type of service for a pizza. The prepared and cooked pizza is cut and placed in a container for sale to the customer and the container is placed on the conveyor 90, which transports it to the lower level 12, to the appropriate service module in a column 29, so that the module operator receiving the order can serve it to the patron through one of the windows 20 or 22.

The invention has been described in detail with particular reference to a preferred embodiment thereof, but it will be understood that variations and modifications can be effected within the scope of the invention.

What is claimed is:

1. A facility adapted for the delivery of food to patrons, said facility comprising:
   a floor slab;
   a base level housing having a preselected floor configuration and floor area, said base level housing being adapted to provide food service to patrons at the level of said base level housing;
   a plurality of vertical support columns attached to said floor slab and substantially disposed within said base level housing;
   patron service personnel disposed in said base level housing;
   a second level housing positionable atop and supported by said support columns, and positionable above and extending outward from said base level housing in cantilevered fashion to provide a larger floor area than said floor area of said base level housing, said second level housing comprising food preparation means for the preparation of food by food preparation personnel disposed therein;
   communication means for communicating the patron's order to said food preparation personnel disposed in said second level housing and to said patron service personnel disposed in said base level housing;
   means for conveying prepared food from said second level housing into said base level housing and for delivering the prepared food to said patron service personnel disposed in said base level housing; and
   means within said base level housing for delivering the prepared food from the patron service personnel to the patrons.

2. The facility of claim 1 wherein said base level housing and said second level housing each comprise a longer dimension and a shorter dimension, with the axis of the longer dimension of each housing disposed perpendicular to each other.

3. The facility of claim 2 wherein said second level housing is parallelepiped shaped.

4. The facility of claim 3 further comprising a flat roof.

5. The facility of claim 2 wherein said base level housing is substantially parallelepiped shaped.

6. The facility of claim 1 wherein said vertical support columns provide the corners of said base level housing.

7. The facility of claim 1 wherein said conveying means comprises said means for delivering prepared food to said patron service personnel disposed within said base level housing.

8. The facility of claim 1 wherein the prepared food comprises pizza and said food preparation means comprises an oven.

9. The facility of claim 1 further comprising a plurality of lights positioned upon at least one of said housings and means for repetitively sequentially illuminating individual ones of said plurality of lights to provide said facility with an illusion of movement.

10. The facility of claim 9 wherein said movement illusion is of second level housing rotation relative to said base level housing.

11. The facility of claim 1 wherein said vertical support columns are cylindrically shaped.

12. The facility of claim 1 wherein at least one of said vertical support columns is hollow.

13. The facility of claim 12 wherein at least one of said hollow vertical support columns surround conduit means for at least one substance selected from the group consisting of water, electricity, sewage, gas, and roof drainage.

14. The facility of claim 12 wherein at least one of said hollow vertical support columns within said base level housing comprises beverage dispensing means disposed therein.

15. The facility of claim 12 wherein at least one of said hollow vertical columns comprises ice dispensing means disposed therein.

16. The facility of claim 12 wherein at least one of said hollow vertical columns comprises beverage cup dispenser means disposed therein.

17. The facility of claim 12 wherein at least one of said hollow vertical columns comprises a sink and drain means disposed therein for collecting waste beverages and transmitting said waste beverages into drain means.

18. The facility of claim 1 wherein one of said vertical support columns comprises at least one pod swingably attached to said column, said pod being adapted for supporting equipment for use by said patron service personnel stationed at said vertical support column.

19. The facility of claim 1 further comprising camera means disposed within said base level housing and positioned to monitor said patron service personnel stationed in said base level housing for transmission to a monitor at a remote patron menu and ordering location.

20. The facility of claim 1 further comprising patron menu providing means disposed remote from said housings of said facility and positioned to provide a drive-up patron with a menu and means for ordering food.

21. The facility of claim 20 wherein said patron menu providing means is completely retractable into the surface form which it extends to protect it from vandalism when not in use.

22. The facility of claim 21 wherein said patron menu providing means is controllably positionable in height to accommodate vehicles having different seating and window heights, whereby the display height of a menu disposed thereon can be positioned to accommodate various drive-up patrons.

23. The facility of claim 20 wherein said patron menu providing means comprises a monitor viewable by the drive-up patron, said monitor being adapted to show thereon, using a camera and associated communication means, said patron service personnel disposed within said facility accommodating the patron.

24. The facility of claim 1 wherein said second level housing further comprises supply delivery port means adapted to receive supplies therethrough directly from a delivery vehicle.

25. The facility of claim 1 wherein said base level housing and said second level housing are prefabricated.

26. The facility of claim 1 comprising at least one drive-up lane disposed on a side of said base level housing and underneath said second level housing.

27. The facility of claim 1 wherein the patrons are walk-up patrons.

28. The facility of claim 1 wherein the patrons are drive-through patrons.

29. The facility of claim 1 wherein the patrons are both walk-up and drive-through patrons.

30. A facility adapted for the delivery of food to patrons, said facility comprising:
   a floor slab;
   a base level housing having a preselected floor configuration and floor area, said base level housing being adapted to provide food service to patrons at the level of said base level housing;
   patron service personnel disposed in said base level housing;
   a second level housing positionable above and extending outward from said base level housing in cantilevered fashion to provide a larger floor area than said floor area of said base level housing, said second level housing comprising food preparation means for the preparation of food by food preparation personnel disposed therein;
   said base level housing and said second level housing each comprise a longer dimension and a shorter dimension, with the axis of the longer dimension of each housing disposed perpendicular to each other;
   communication means for communicating the patron's order to said food preparation personnel disposed in said second level housing and to said patron service personnel disposed in said base level housing;
   means for conveying prepared food from said second level housing into said base level housing and for delivering the prepared food to said patron service personnel disposed in said base level housing; and
   means within said base level housing for delivering the prepared food from the patron service personnel to the patrons.

31. The facility of claim 30 wherein said second level housing is substantially supported on a plurality of vertical support columns disposed within said base level housing.

32. The facility of claim 30 wherein said vertical support columns are cylindrically shaped.

33. The facility of claim 31 wherein at least one of said vertical support columns is hollow.

34. The facility of claim 33 wherein at least one of said hollow vertical support columns surround conduit means for at least one substance selected from the group consisting of water, electricity, sewage, gas, and roof drainage.

35. The facility of claim 33 wherein at least one of said hollow vertical support columns within said base level housing comprises beverage dispensing means disposed therein.

36. The facility of claim 33 wherein at least one of said hollow vertical columns comprises ice dispensing means disposed therein.

37. The facility of claim 33 wherein at least one of said hollow vertical columns comprises beverage cup dispenser means disposed therein.

38. The facility of claim 33 wherein at least one of said hollow vertical columns comprises a sink and drain means disposed therein for collecting waste beverages and transmitting said waste beverages into drain means.

39. The facility of claim 31 wherein one of said vertical support columns comprises at least one pod swingably attached to said column, said pod being adapted for supporting equipment for use by service personnel stationed at said vertical support column.

40. The facility of claim 30 wherein said conveying means comprises means for delivering prepared food to said patron service personnel disposed within said base level housing.

41. The facility of claim 30 wherein the prepared food comprises pizza and said food preparation means comprises an oven.

42. The facility of claim 30 further comprising a plurality of lights positioned upon at least one of said housings and means for repetitively sequentially illuminating individual ones of said plurality of lights to provide said facility with an illusion of movement.

43. The facility of claim 42 wherein said movement illusion is of second level housing rotation relative to said base level housing.

44. The facility of claim 30 further comprising camera means disposed within said base level housing and positioned to monitor said patron service personnel stationed in said base level housing for transmission to a monitor at a remote patron menu and ordering location.

45. The facility of claim 30 further comprising patron menu providing means disposed remote from said housings of said facility and positioned to provide a drive-up patron with a menu and means for ordering food.

46. The facility of claim 45 wherein said patron menu providing means is completely retractable into the surface form which it extends to protect it from vandalism when not in use.

47. The facility of claim 46 wherein said patron menu providing means is controllably positionable in height to accommodate vehicles having different seating and window heights, whereby the display height of a menu disposed thereon can be positioned to accommodate various drive-up patrons.

48. The facility of claim 45 wherein said patron menu providing means comprises a monitor viewable by the drive-up patron, said monitor being adapted to show thereon, using a camera and associated communication means, said patron service personnel within said facility accommodating the patron.

49. The facility of claim 30 wherein said second level housing further comprises supply delivery port means adapted to receive supplies therethrough directly from a delivery vehicle.

50. The facility of claim 30 wherein said base level housing and said second level housing are prefabricated.

51. The facility of claim 30 comprising at least one drive-up lane disposed on a side of said base level housing and underneath said second level housing.

52. The facility of claim 30 wherein said second level housing is parallelepiped shaped.

53. The facility of claim 52 further comprising a flat roof.

54. The facility of claim 30 wherein said base level housing is substantially parallelepiped shaped.

55. The facility of claim 30 wherein the patrons are walk-up patrons.

56. The facility of claim 30 wherein the patrons are drive-through patrons.

57. The facility of claim 30 wherein the patrons are both walk-up and drive-through patrons.

58. A facility adapted for the delivery of food to patrons, said facility comprising:
a floor slab;
a base level housing having a preselected floor configuration and floor area, said base level housing being adapted to provide food service to patrons at the level of said base level housing;
patron service personnel disposed in said base level housing;
a second level housing positionable above and extending outward from said base level housing in cantilevered fashion to provide a larger floor area than said floor area of said base level housing, said second level housing comprising food preparation means for the preparation of food by food preparation personnel disposed therein;
communication means for communicating the patron's order to said food preparation personnel disposed in said second level housing and to said patron service personnel disposed in said base level housing;
means for conveying prepared food from said second level housing into said base level housing and for delivering the prepared food to said patron service personnel disposed in said base level housing; and
means within said base level housing for delivering the prepared food from the patron service personnel to the patrons.

59. The facility of claim 58 wherein said conveying means comprises means for delivering prepared food to said patron service personnel disposed within said base level housing.

60. The facility of claim 58 wherein the prepared food comprises pizza and said food preparation means comprises an oven.

61. The facility of claim 58 further comprising a plurality of lights positioned upon at least one of said housings and means for repetitively sequentially illuminating individual ones of said plurality of lights to provide said facility with an illusion of movement.

62. The facility of claim 61 wherein said movement illusion is of second level housing rotation relative to said base level housing.

63. The facility of claim 58 further comprising camera means disposed within said base level housing and positioned to monitor said patron service personnel stationed in said base level housing for transmission to a monitor at a remote patron menu and ordering location.

64. The facility of claim 58 further comprising patron menu providing means disposed remote from said housings of said facility and positioned to provide a drive-up patron with a menu and means for ordering food.

65. The facility of claim 64 wherein said patron menu providing means is completely retractable into the surface form which it extends to protect it from vandalism when not in use.

66. The facility of claim 65 wherein said patron menu providing means is controllably positionable in height to accommodate vehicles having different seating and window heights, whereby the display height of a menu disposed thereon can be positioned to accommodate various drive-up patrons.

67. The facility of claim 64 wherein said patron menu providing means comprises a monitor viewable by a drive-up patron, said monitor being adapted to show thereon, using a camera and associated communication means, the patron service personnel within said facility accommodating the patron.

68. The facility of claim 58 wherein said second level housing further comprises supply delivery port means adapted to receive supplies therethrough directly from a delivery vehicle.

69. The facility of claim 58 wherein said base level housing and said second level housing are prefabricated.

70. The facility of claim 58 comprising at least one drive-up lane disposed on a side of said base level housing and underneath said second level housing.

71. The facility of claim 58 wherein the patrons are walk-up patrons.

72. The facility of claim 58 wherein the patrons are drive-through patrons.

73. The facility of claim 58 wherein the patrons are both walk-up and drive-through patrons.

74. A beverage dispensing facility comprising a service window and a plurality of structural columns adjacent to a personnel working area, wherein at least one of said structural columns comprises a tubular structural member, said tubular structural member including an opening therein at a level corresponding to the level of said service window of said facility, beverage dispensing means disposed within said tubular structural member and positioned within said opening in said structural member, said beverage dispensing means including a plurality of beverage dispensers supplied by beverage supply lines and drain means for carrying waste beverages out of said structural member.

75. The beverage dispensing facility of claim 74 wherein said drain means in said tubular structural member carries waste beverages downwardly through and out of said structural member.

76. The beverage dispensing facility of claim 74 wherein said structural column further comprises cup dispenser means disposed within said structural member for retaining and dispensing a plurality of cups within said structural member.

77. The beverage dispensing facility of claim 76 wherein said facility comprises a multi-story facility and said cup dispenser means extends upwardly in said tubular structural member to an upper story of said facility, whereby said cup dispenser means may be replenished with cups by personnel located in said upper story of said facility.

78. The beverage dispensing facility of claim 77 wherein said cups may also be replenished by personnel located at said service window.

79. The beverage dispensing facility of claim 74 wherein said structural column further comprises at least one pod swingable attached to said structural member adjacent to said opening in said structural member, said pod being adapted for supporting equipment for use by service personnel stationed at said column.

80. The beverage dispensing facility of claim 79 wherein said equipment comprises a cash register or cash drawer.

81. The beverage dispensing facility of claim 74 further comprising camera means affixed to said structural member and positioned to monitor a service person stationed at said service window for transmission to a monitor at a remote menu and ordering location.

82. The beverage dispensing facility of claim 74 further comprising a sink disposed within said tubular structural member for collecting waste beverages and transmitting said waste beverages into said drain means.

83. The beverage dispensing facility of claim 74 further comprising ice dispensing means disposed within said tubular structural member.

84. The beverage dispensing facility of claim 74 wherein said facility comprises a multi-story facility.

85. The beverage dispensing facility of claim 84 wherein said beverage supply lines extend downward in said tubular structural member from an upper story of said facility.

86. The beverage dispensing facility of claim 74 wherein at least one of said other structural columns comprises utility lines selected from the group consisting of electrical lines, gas lines, water lines, sewage lines, and roof drain lines.

87. A remote locatable, protectable food menu and order display unit, comprising an outer housing and in inner housing, said inner housing comprising food menu means and communication means for communicating with a remote food service location and said inner housing cooperably and telescopically vertically slidable within said outer housing, and means for selectively extending and retracting said inner housing with respect to said outer housing between a retracted position wherein the tops of said inner housing and said outer housing are substantially flush with a ground surface and an operating extended position wherein said inner housing is telescopically slidably positioned above ground such that said food menu means and communication means are usable by a patron ordering food, and said outer housing is slidable above and below the group level.

88. The remotely locatable, protectable food menu and order display unit of claim 87 wherein said inner housing further comprises cover means engageable against one end of said outer housing means, said cover means made of sufficiently hard and durable construction as to be resistant to damage by vandalism.

89. The remotely locatable, protectable food menu and order display unit of claim 87 wherein said communication means comprises a speaker and microphone unit, and a screen display unit for displaying the face of a food service person remotely located at said remote food service location and in communication with the food-ordering patron through said speaker and microphone unit.

90. The remotely locatable, protectable food menu and order display unit of claim 87 further comprising control means associated with said inner housing, whereby said food menu and order display unit can be selectively adjusted to the height needed by said food-ordering patron.

* * * * *